(12) United States Patent
Lefler et al.

(10) Patent No.: US 8,191,572 B2
(45) Date of Patent: Jun. 5, 2012

(54) SNAP ACTION VALVE WITH BUMPER PAD

(75) Inventors: Jason Lefler, Brooklyn, MI (US); William E. Hill, Ann Arbor, MI (US); Jordan Sahs, Grass Lake, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 449 days.

(21) Appl. No.: 12/424,915

(22) Filed: Apr. 16, 2009

(65) Prior Publication Data
US 2010/0263743 A1 Oct. 21, 2010

(51) Int. Cl.
*F16K 15/03* (2006.01)
(52) U.S. Cl. .......................... 137/527; 251/64
(58) Field of Classification Search .................. 137/527; 251/64
See application file for complete search history.

(56) References Cited

U.S. PATENT DOCUMENTS

| | | |
|---|---|---|
| 1,613,332 A | 1/1927 | Goetz |
| 1,709,426 A | 4/1929 | Beery |
| 1,832,090 A | 11/1931 | Branche |
| 1,840,082 A | 1/1932 | Breer |
| 1,860,892 A | 5/1932 | Gray |
| 2,072,372 A | 3/1937 | Kingsley |
| 2,157,030 A | 5/1939 | Starkweather |
| 2,268,806 A | 1/1942 | Curtis |
| 2,380,374 A | 7/1945 | Anderson |
| 2,556,277 A | 6/1951 | Hill et al. |
| 2,855,283 A | 10/1958 | Schumacher |
| 2,986,373 A | 5/1961 | Masheder |
| 3,020,980 A | 2/1962 | Baker et al. |
| 3,406,783 A | 10/1968 | Haffer |
| 3,625,249 A * | 12/1971 | Karr ............................. 137/497 |
| 3,703,937 A | 11/1972 | Tenney |
| 4,264,344 A | 4/1981 | Ludecke et al. |
| 4,356,801 A | 11/1982 | Graham |
| 4,378,003 A | 3/1983 | Imamura |
| 4,396,034 A | 8/1983 | Cherniak |
| 4,541,506 A | 9/1985 | Venning et al. |
| 4,563,605 A | 1/1986 | Gerber |
| 4,565,176 A | 1/1986 | Alf et al. |
| 4,707,987 A | 11/1987 | Atkin |
| 4,805,571 A | 2/1989 | Humphrey |
| 4,825,983 A | 5/1989 | Nakanishi |
| 4,903,486 A | 2/1990 | Finkle |
| 5,044,396 A | 9/1991 | Daudet et al. |
| 5,355,673 A | 10/1994 | Sterling et al. |
| 5,392,812 A | 2/1995 | Herron |
| 5,581,056 A | 12/1996 | Bellgardt et al. |
| 5,633,482 A | 5/1997 | Erion et al. |
| 5,692,374 A | 12/1997 | Seki et al. |

(Continued)

FOREIGN PATENT DOCUMENTS
EP 1045180 10/2000
(Continued)

*Primary Examiner* — Kevin Lee
*Assistant Examiner* — Macade Brown
(74) *Attorney, Agent, or Firm* — Harness, Dickey & Pierce, P.L.C.

(57) ABSTRACT

A rotary valve plate adapted for housing within a conduit employs a vibration absorbing bumper pad coupled to the valve plate at a surface thereof adapted to contact an inner surface of the conduit whenever the valve plate is rotated to a closed position. The bumper pad minimizes vibratory noise and improves the durability of the valve plate over extended periods of operation.

18 Claims, 3 Drawing Sheets

U.S. PATENT DOCUMENTS

| | | | |
|---|---|---|---|
| 5,723,829 A | 3/1998 | Inomata et al. | |
| 5,739,483 A | 4/1998 | Yashiro et al. | |
| 5,744,762 A | 4/1998 | Seki et al. | |
| 5,749,335 A | 5/1998 | Flanery et al. | |
| 5,801,343 A | 9/1998 | Suzuki et al. | |
| 5,813,380 A | 9/1998 | Takahashi et al. | |
| 5,821,474 A | 10/1998 | Olszok et al. | |
| 5,839,489 A | 11/1998 | Ganachaud et al. | |
| 5,931,052 A | 8/1999 | Zhao et al. | |
| 5,971,098 A | 10/1999 | Suzuki et al. | |
| 5,971,859 A | 10/1999 | Runge et al. | |
| 5,984,045 A | 11/1999 | Maeda et al. | |
| 6,189,650 B1 | 2/2001 | Inuzuka et al. | |
| 6,193,214 B1 | 2/2001 | Schatz | |
| 6,332,442 B1 | 12/2001 | Komada et al. | |
| 6,499,562 B1 | 12/2002 | Elfinger et al. | |
| 6,527,006 B2 | 3/2003 | Jackson | |
| 6,536,567 B2 | 3/2003 | Nakanishi | |
| 6,553,963 B1 | 4/2003 | Noble | |
| 6,564,902 B1 | 5/2003 | Saberi | |
| 6,581,721 B2 | 6/2003 | Nagai et al. | |
| 6,598,390 B2 | 7/2003 | Chang | |
| 6,604,516 B1 | 8/2003 | Krimmer et al. | |
| 6,637,545 B1 | 10/2003 | Jonsson et al. | |
| 6,640,927 B1 | 11/2003 | Turner | |
| 6,732,511 B2 | 5/2004 | Unbehaun et al. | |
| 7,182,171 B2 | 2/2007 | Weinert et al. | |
| 7,201,142 B2 * | 4/2007 | Peffley et al. | 123/337 |
| 7,310,942 B2 * | 12/2007 | Shiga et al. | 60/324 |
| 7,434,570 B2 | 10/2008 | Hill | |
| 2003/0000582 A1 * | 1/2003 | Jackson | 137/527.6 |
| 2004/0178015 A1 | 9/2004 | Wiemeler et al. | |
| 2006/0272322 A1 | 12/2006 | Abram et al. | |
| 2008/0223025 A1 | 9/2008 | Hill | |
| 2008/0224083 A1 | 9/2008 | Hill | |
| 2008/0245063 A1 | 10/2008 | Hill | |
| 2009/0127023 A1 | 5/2009 | Abram et al. | |

FOREIGN PATENT DOCUMENTS

| | | |
|---|---|---|
| JP | 1997-303143 A | 11/1997 |
| JP | 1998-141041 A | 5/1998 |
| JP | 2000-002112 | 1/2000 |
| JP | 2002-235536 | 8/2002 |
| JP | 2006-322411 | 11/2006 |
| KR | 10-1998-0002656 A | 3/1998 |
| KR | 10-1998-0009780 A | 4/1998 |
| KR | 10-2001-0038902 A | 5/2001 |
| WO | WO2008-115212 | 9/2008 |

* cited by examiner

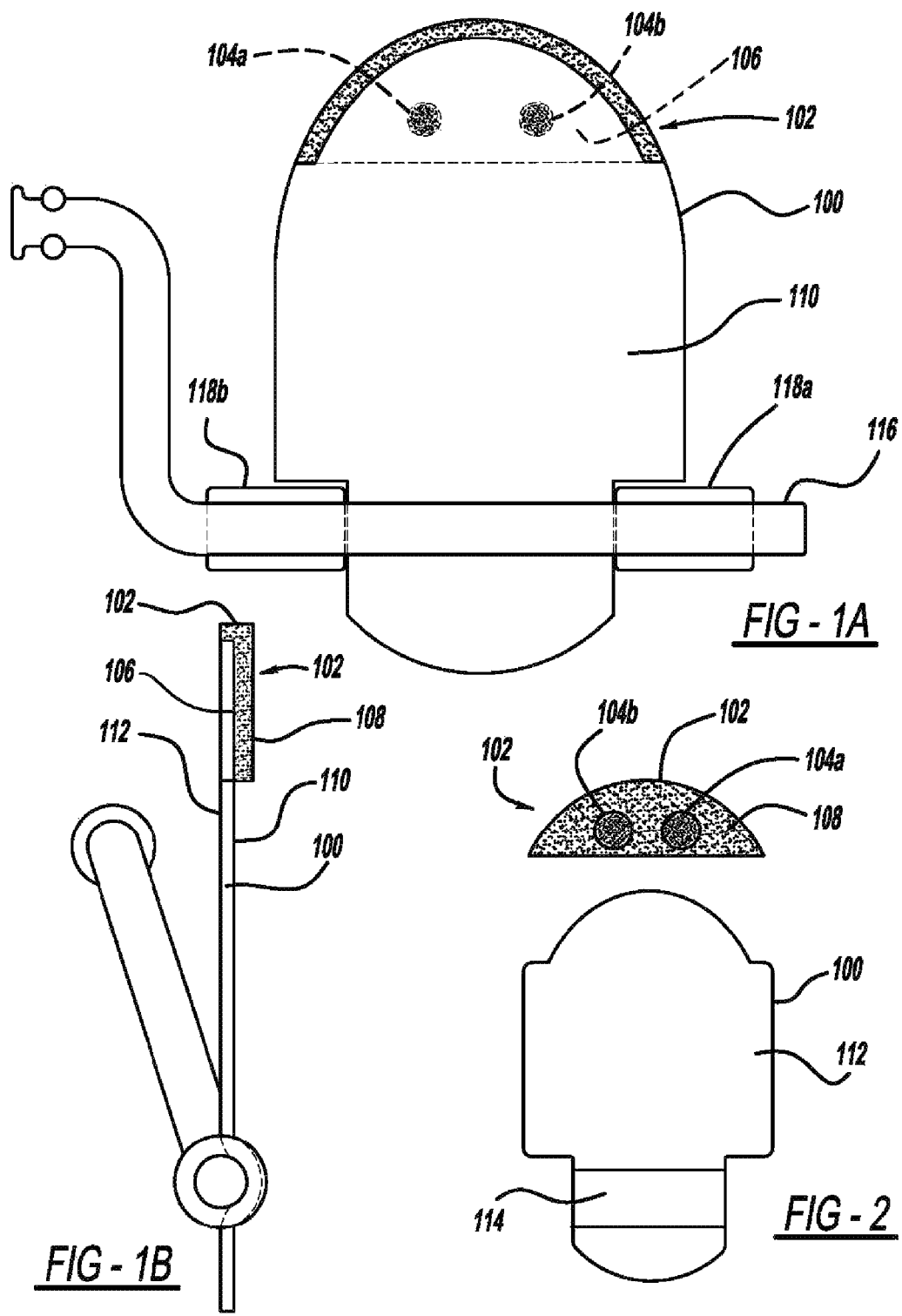

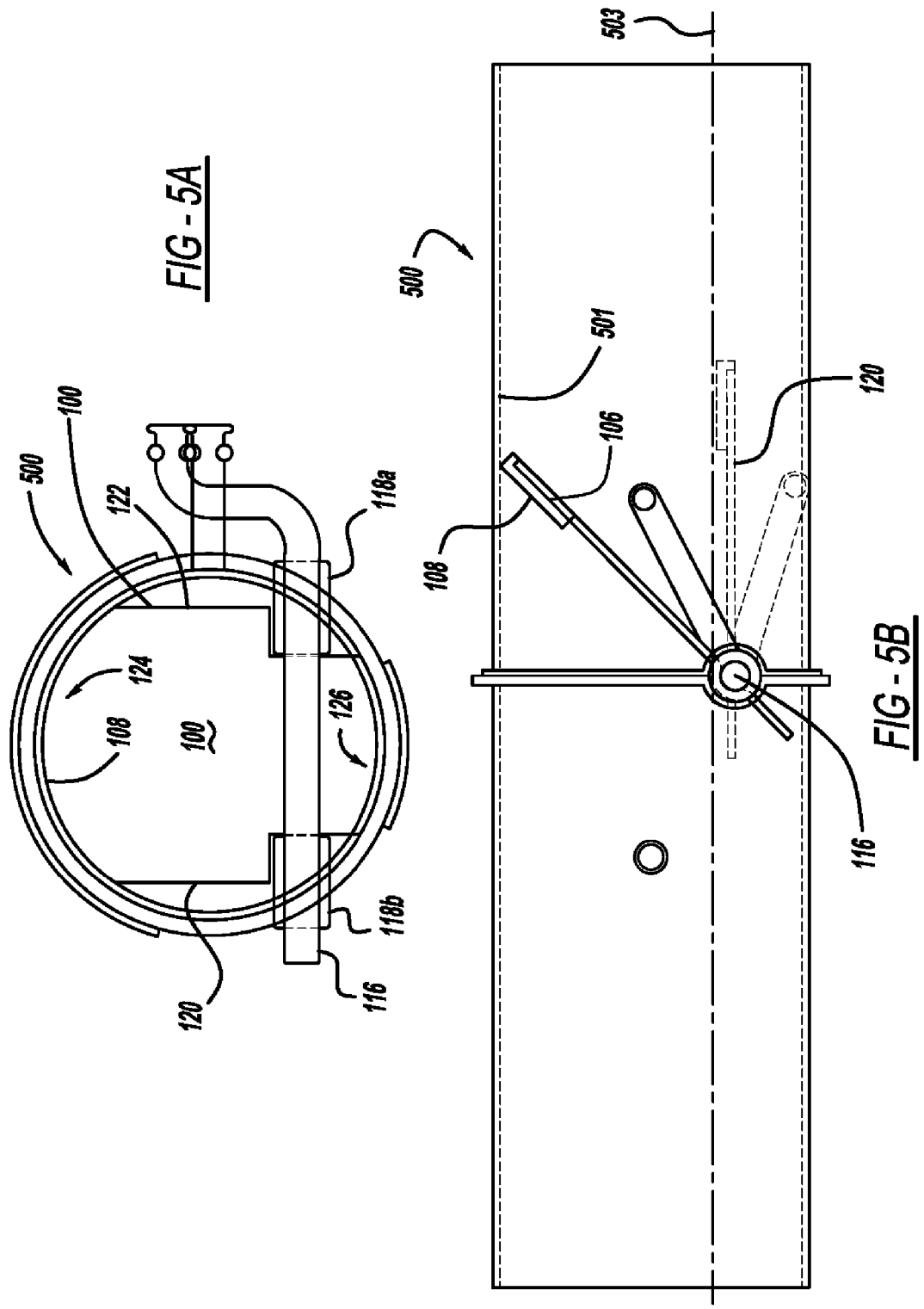

SNAP ACTION VALVE WITH BUMPER PAD

FIELD

The present disclosure relates to valve flaps or plates equipped with a vibration absorbing bumper pad.

BACKGROUND

This section provides background information related to the present disclosure which is not necessarily prior art.

Many exhaust systems in the automotive field have attempted to use both active and passive valve assemblies to alter the characteristics of exhaust flow through a conduit as the exhaust pressure increases due to increasing engine speed. Active valves carry the increased expense of requiring a specific actuating element, such as a solenoid. Passive valves utilize the pressure of the exhaust stream in the conduit with which the valve is associated.

Traditionally, passive valves, even at their lower expense, give rise to problems of accelerated wear and vibratory noise or chatter when the valve switches from an open position to a fully closed position wherein a portion of the valve plate contacts an inner surface of the conduit housing the valve.

SUMMARY

This section provides a general summary of the disclosure, and is not a comprehensive disclosure of its full scope or all of its features.

Accordingly, in a rotary valve plate adapted for housing within a conduit, a vibration absorbing bumper pad is coupled to the valve plate at a surface thereof adapted to contact an inner surface of the conduit whenever the valve plate is rotated to a closed position.

In a further aspect of the disclosed teachings, an exhaust pressure actuated valve assembly for placement inside a tubular exhaust conduit includes a valve flap having first and second arcuate edges substantially conforming to and in contact with curved portions of the exhaust conduit when the valve flap is in a closed position. First and second linear edges of the valve flap extend between the first and second arcuate edges and provide clearance between the valve flap and an inner surface of the conduit when the valve flap is in a closed position. An axle is adapted to pivotally couple the valve flap to the exhaust conduit about a longitudinal axis of the axle. The axle includes first and second legs protruding outwardly of the first and second linear edges of the valve flap and adapted to be received in openings of the exhaust conduit. A vibration absorbing bumper pad is coupled to the valve flap at one of the first and second arcuate edges.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The objects and features of the present teachings will become apparent upon a reading of a detailed description, taken in conjunction with the drawing, in which:

FIGS. 1A and 1B are a front plan view and a side plan view, respectively, of a snap action valve plate assembly arranged in accordance with the present teachings;

FIG. 2 is an exploded view of a bumper pad and valve plate taken from the rear side of the plate;

FIGS. 5A, 5B present respective end and side cross-sectional views of a conduit housing a snap action valve plate arranged in accordance with the present teachings.

Corresponding reference numerals indicate corresponding parts throughout the several views of the drawings.

DETAILED DESCRIPTION

Figure 3:
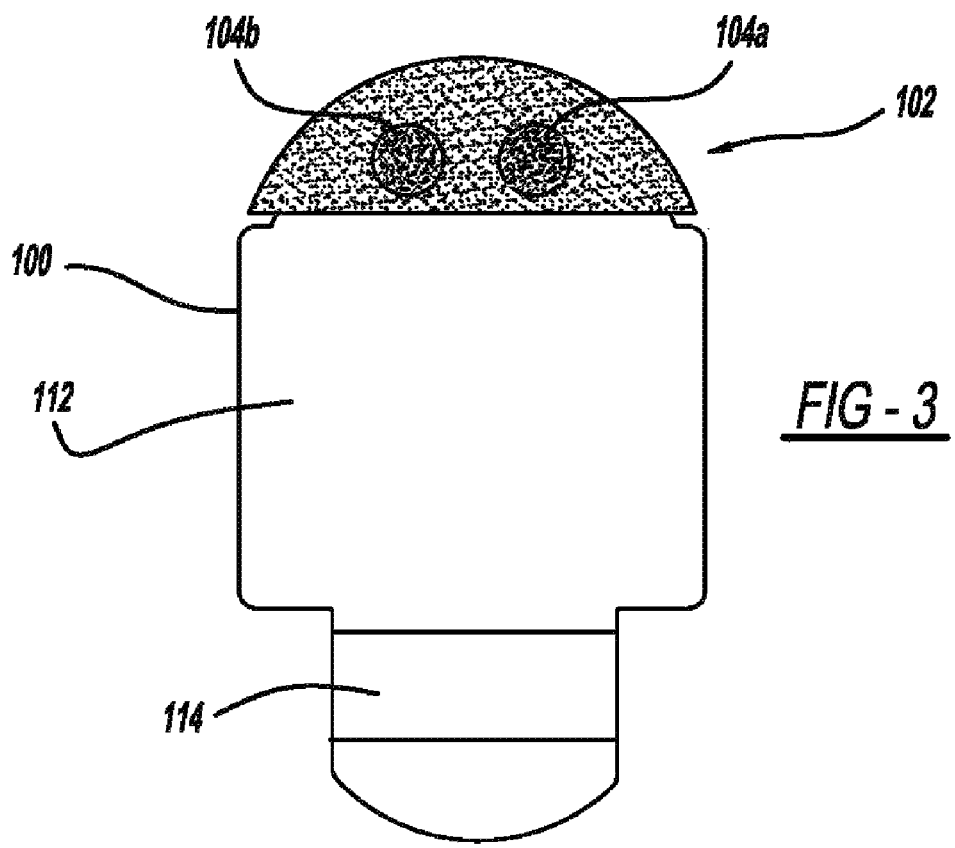
FIG. 3 is a rear view of the valve plate in the assembled bumper pad/valve plate condition.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 4:
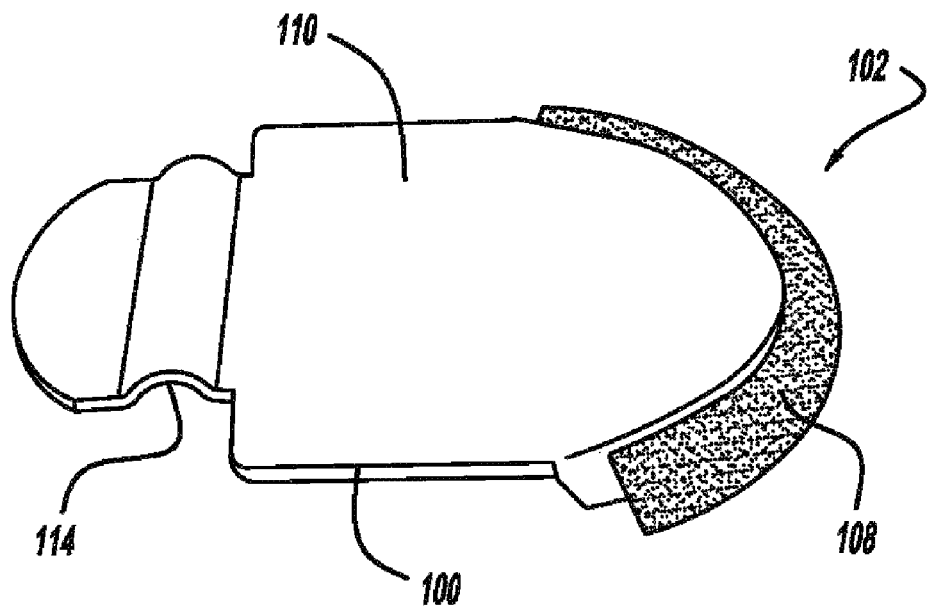
FIG. 4 is a perspective view of a front face of a valve plate assembly arranged in accordance with the present teachings.

With reference to FIGS. 1A, 1B, 2, 3 and 4, snap action valve plate 100 has a front surface 110, a rear surface 112 and an indentation 114 in the valve plate for receipt of axle 116.

Valve plate 100 and axle 116 are substantially similar to the snap action valve assembly disclosed in commonly assigned U.S. Pat. No. 7,434,570. An improvement to snap action plate 100 is the addition of a vibration absorbing bumper pad 102 having a rear surface 106 and a front surface 108. Compressed dent regions 104a and 104b of bumper pad 102 have an increased density and promote stronger spot welding of bumper pad 102 to valve plate 110 in the area of dents 104a and 104b. Preferably, dent regions 104a and 104b are substantially circular as shown.

Bumper pad 102 is preferably comprised of a vibration absorbing knitted metal mesh material, preferably stainless steel.

As seen from FIG. 1A, axle 116 has first and second legs extending from opposite edges of valve plate 110 and these legs are each surrounded by bushings 118a and 118b which preferably also are comprised of knitted stainless steel mesh.

Bumper pad 102 is welded to valve plate 110 such that it covers one of the arcuate edges of valve plate 110 which comes into contact with an inner surface of a conduit in which it is mounted when the valve swings to its fully closed position as shown in solid lines in FIGS. 5A and 5B. Valve plate 120 is shown in phantom outline in FIG. 5B when the valve has rotated to a fully opened position wherein linear edges 120 and 122 of valve plate 100 contact the inner surface of conduit 500, and in this fully opened position edges 120 and 122 are substantially parallel to a longitudinal axis 503 of conduit 500. In the closed position of valve 100 shown in FIG. 5A, it is seen that the arcuate edges 124 and 126 of valve plate 100 are in contact with a matching arcuate internal surface of conduit 500. A front surface 108 of bumper pad 102 cushions the impact between plate 120 and conduit 500 as the valve plate is rotated to the fully closed position. The mesh bumper pad thus absorbs vibrations and minimizes vibratory noise and excessive wear of the valve plate 120.

The foregoing description has been provided for purposes of illustration and example. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. In a rotary valve plate adapted for housing within a conduit,
   a vibration absorbing bumper pad including a substantially planar first surface coupled to the valve plate at a surface thereof, the bumper pad being adapted to contact an inner surface of the conduit whenever the valve plate is rotated to a closed position and including a substantially planar second surface extending substantially parallel to the first surface, the second surface including an uninterrupted compressed dent region in the bumper pad having an increased density, the compressed dent region being welded to the valve plate.

2. The apparatus of claim 1 wherein the bumper pad comprises knitted metal mesh.

3. The apparatus of claim 2 wherein the knitted metal mesh comprises stainless steel.

4. The apparatus of claim 1 further comprising:
   an axle coupled to the valve plate and having first and second legs extending from opposing edges of the valve plate; and
   first and second vibration absorbing bushings respectively surrounding the first and second legs and adapted to be received by openings through the conduit.

5. The apparatus of claim 4 wherein the first and second bushings are comprised of material identical to that of the bumper pad.

6. The apparatus of claim 4 wherein the first and second bushings comprise knitted metal mesh.

7. The apparatus of claim 6 wherein the knitted metal mesh comprises stainless steel.

8. In a rotary valve plate adapted for housing within a conduit,
   a vibration absorbing bumper pad including a substantially planar first surface coupled to the valve plate at a surface thereof, the bumper pad being adapted to contact an inner surface of the conduit whenever the valve plate is rotated to a closed position and including a substantially planar second surface extending substantially parallel to the first surface, the second surface including a compressed dent region in the bumper pad having an increased density, the compressed dent region being welded to the valve plate, wherein the bumper pad includes a portion covering an edge of the plate, the portion being trapped between the plate and the inner surface of the conduit when the valve plate is at the closed position.

9. The apparatus of claim 1 wherein the compressed dent region is substantially circular.

10. An exhaust pressure actuated valve assembly for placement inside a tubular exhaust conduit, the valve assembly comprising:
    a valve flap having first and second arcuate edges substantially conforming to curved portions of the exhaust conduit when the valve flap is in a closed position, and first and second linear edges extending between the first and second arcuate edges and providing clearance between the valve flap and an inner surface of the conduit when the valve flap is rotating between open and closed positions;
    an axle adapted to pivotally couple the valve flap to the exhaust conduit about a longitudinal axis of the axle, the axle coupled to the valve flap between the first and second arcuate edges, the axle including first and second legs protruding outwardly from the first and second linear edges of the valve flap and adapted to be received in openings of the exhaust conduit; and
    a vibration absorbing bumper pad comprising a knitted metal mesh and being coupled to the valve flap at one of the first and second arcuate edges; the bumper pad including an arcuate edge conforming to and in contact with the inner surface of the exhaust conduit, the bumper pad further including an uninterrupted compressed dent region having an increased density, the compressed dent region being welded to the valve flap, the bumper pad cushioning an impact between the valve flap and the conduit as the valve flap moves into the closed position.

11. The valve assembly of claim 10 wherein the knitted metal mesh comprises stainless steel.

12. The valve assembly of claim 10 further comprising first and second vibration absorbing bushings respectively surrounding the first and second legs of the axle.

13. The valve assembly of claim 12 wherein the first and second bushings are comprised of material identical to that of the bumper pad.

14. The valve assembly of claim 12 wherein the first and second bushings comprise knitted metal mesh.

15. The valve assembly of claim 14 wherein the knitted metal mesh comprises stainless steel.

16. The valve assembly of claim 10 wherein the compressed dent region is substantially circular.

17. The valve assembly of claim 10 wherein the bumper pad includes a portion covering an edge of the valve flap, the portion being trapped between the valve flap and the inner surface of the conduit when the valve flap is in the closed position.

18. The valve assembly of claim 10 wherein the first and second linear edges of the valve flap contact the inner surface of the conduit when the valve flap is at the open position.

* * * * *